United States Patent [19]
Tomatsuri et al.

[11] 4,367,028
[45] Jan. 4, 1983

[54] CAMERA WITH PROTECTIVE COVER

[75] Inventors: Masakazu Tomatsuri, Naka; Hiroshi Wakabayashi, Yokohama; Takeshi Okuyama, Kawasaki, all of Japan

[73] Assignee: Nippon Kogaku K.K., Tokyo, Japan

[21] Appl. No.: 265,212

[22] Filed: May 19, 1981

[30] Foreign Application Priority Data

Jun. 7, 1980 [JP] Japan ............... 55-76069

[51] Int. Cl.³ ............... G03B 17/02; G03B 13/02
[52] U.S. Cl. ............... 354/288; 354/219
[58] Field of Search ............... 354/202, 203, 219, 214, 354/187, 275, 288; 242/71.1

[56] References Cited

U.S. PATENT DOCUMENTS

| | | | |
|---|---|---|---|
| 3,256,793 | 6/1966 | Denk et al. | 354/288 |
| 3,611,896 | 10/1971 | Aoki | 354/202 |
| 4,019,192 | 4/1977 | Miyagawa | 354/187 |
| 4,096,506 | 6/1978 | Lange | 354/288 |
| 4,240,735 | 5/1980 | Maitani et al. | 354/288 |
| 4,283,132 | 8/1981 | Engelsmann et al. | 354/202 |

FOREIGN PATENT DOCUMENTS

| | | | |
|---|---|---|---|
| 870941 | 3/1953 | Fed. Rep. of Germany | 354/288 |
| 941762 | 4/1956 | Fed. Rep. of Germany | 354/202 |

*Primary Examiner*—Donald A. Griffin
*Attorney, Agent, or Firm*—Shapiro and Shapiro

[57] ABSTRACT

In a camera having a camera housing, an objective optical system disposed on a front face of the camera housing, and a protective cover slidable along the front face of the camera housing between a position for covering the optical system and a position for exposing the optical system, the front face of the camera housing has on the left and right sides of the objective optical system a pair of gripping portions by which the camera may be held during photography and the protective cover is slidable vertically between the pair of gripping portions.

5 Claims, 13 Drawing Figures

4,367,028

CAMERA WITH PROTECTIVE COVER

BACKGROUND OF THE INVENTION

This invention relates to a camera provided with a cover for protecting an optical system disposed on a front face of the camera housing.

A known type of camera having a protective cover is disclosed, for example, in U.S. Pat. No. 4,240,735. In this arrangement the cover slides laterally between positions in which it covers and uncovers the optical system. When the optical system is uncovered, for the shooting of a photograph, the cover is located on a portion of the camera which is gripped by the user and there is the possibility that the cover can inadvertently be moved during shooting to a position at least partly covering the optical system.

SUMMARY OF THE INVENTION

Briefly stated, the present invention provides a camera having a protective cover for an optical system of the camera wherein the cover is positioned centrally on the front face of the camera between a pair of gripping portions of the camera and is adapted to slide vertically between positions in which it covers and uncovers the optical system (i.e., the cover is adapted to slide in a direction substantially perpendicular to the direction in which the gripping portions are spaced apart).

In one preferred form of the invention, where the optical system includes a lens and left- and right-hand objective windows on opposite sides of and above the lens, the cover is substantially U-shaped having a base portion for covering and uncovering the lens, and upright portions for covering and uncovering the respective windows.

The invention will become fully apparent from the following detailed description thereof taken in conjunction with the accompanying drawings.

DESCRIPTION OF THE PRIOR ART

Figure 1:
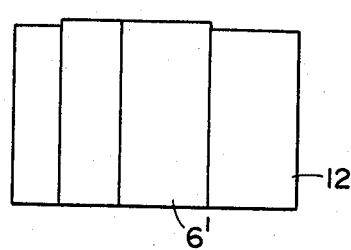
FIGS. 1 and 2 are front views of a known form of camera provided with a protective cover, FIG. 1 showing a condition in which the camera optical system is covered and FIG. 2 showing a condition in which the optical system is uncovered.
Figure 2:
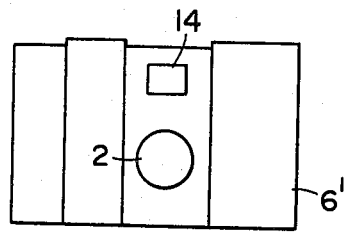

The camera shown in FIGS. 1 and 2 is of the type shown, for example, in the aforementioned U.S. patent. On the front face of the camera housing, there is provided a protective cover 6' which covers an objective optical system comprising a photographic lens 2 and an objective window 14 for a viewfinder. The cover can be slid laterally; namely, right and left as viewed in the figures, along the front face of the camera housing to expose and cover the lens 2 and the objective window 14. FIG. 1 is a view showing a condition in which the optical system is covered with the protective cover 6', and FIG. 2 is a view showing a condition in which the optical system is exposed during photography. When the protective cover is located at position 12, where the camera is usually held during photography, it is movable by a user and unstable holding of the camera may result. Thus, for example, there is the possibility that the cover 6' may be moved inadvertently during photography to cover the lens, resulting in failure of the photography. Also, there is a limitation in design in that the light-emitting portion of a flash unit or the operating member for data photographing which should be exposed during photography cannot be disposed at the location 12 which is covered with the protective cover 6' during photography.

DESCRIPTION OF PREFERRED EMBODIMENTS

Figure 3:
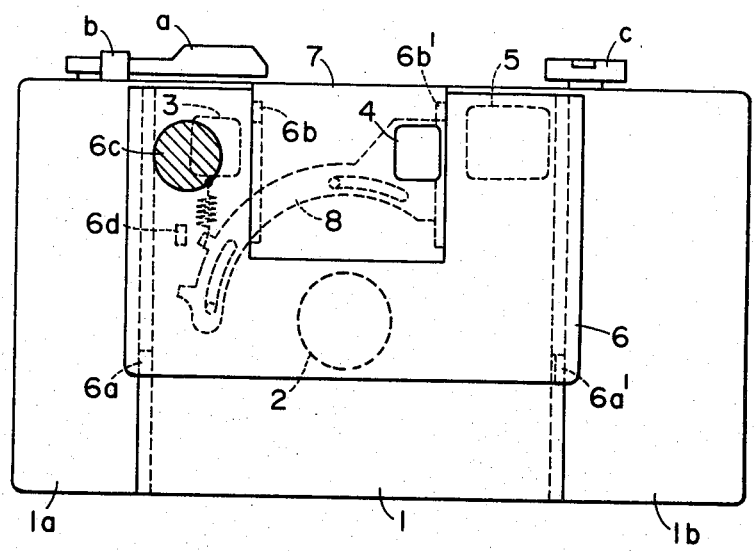
FIGS. 3 and 4 are front views of a camera according to a first embodiment of the present invention, FIG. 3 showing a condition in which the camera optical system is covered by a protective cover and FIG. 4 showing a condition in which the optical system is uncovered.

A first embodiment of the present invention is shown in FIGS. 3-8. In FIG. 3, reference numeral 1 designates a camera housing. On the left and right sides of the front face of housing 1, are holding portions 1a and 1b which may be gripped during photography. A photographic lens 2 is disposed substantially in the central portion of the housing between portions 1a and 1b, autofocusing range finders 3 and 4 are disposed above and to the left and right of the lens 2, and a viewfinder 5 is disposed to the right of the range finder 4 at a predetermined distance therefrom. Elements 2, 3, 4 and 5 together form an objective optical system.

On the upper surface of the camera are situated a film-advance lever a, a release button b, and a film-rewind knob c.

Provided on camera housing 1 is a protective cover 6 for covering the front faces of the lens 2, one of the range finders, 3, and the viewfinder 5 and which, during photography, may be slid vertically along the front face of the camera housing 1 to expose the lens 2, the range finder 3 and the viewfinder 5. Cover 6 is U-shaped so that in its covering position (FIG. 3) it covers one of the range finders, 3, and the viewfinder 5 with its left and right upright portions, respectively, and covers the lens 2 with its central base portion. In the exposing position of the cover (FIG. 4), it does not interfere with the operation of the objective optical system.

If the laterally slidable protective cover shown in FIGS. 1 and 2 is applied to a camera as shown in FIG. 3 wherein a pair of left and right objective windows 3, 5 are disposed in the front face of the camera housing 1 above the lens 2, the stroke required for sliding the cover is greatly increased and, therefore, the camera will need to be suitably enlarged in lateral dimension. The protective cover of the present embodiment does not compel the camera to be varied in dimensions.

Figure 4:
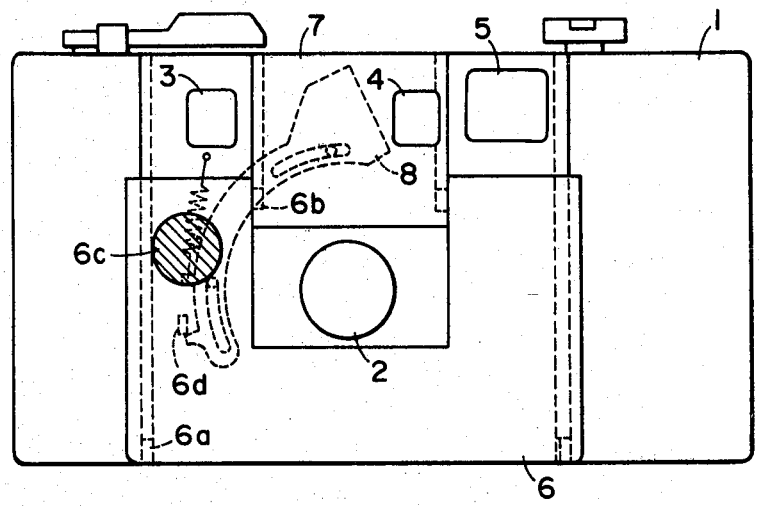
Figure 8:
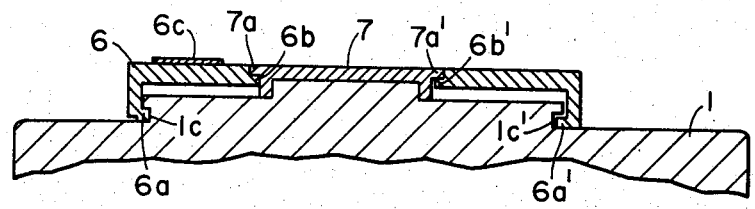
FIG. 8 is a cross-sectional view of a guide portion for the protective cover.

As shown in FIGS. 3, 4 and 8, a pair of projections 6a, 6a' at the opposite edges of the base portion of cover 6 are received in slide grooves 1c, 1c' formed vertically in the camera housing 1. A further pair of projections 6b, 6b' provided on the inner edges of the left and right upper end portions of the cover 6 are received behind vertically extending edge portions 7a, 7a' of a keep plate 7. The engagement between the projection 6a and the slide groove 1c and between the edge portion 7a and the projection 6b constitutes a guide means for the cover 6. The engagement between the projection 6a' and the slide groove 1c' and between the edge portion 7a' and the projection 6b' includes a clearance and prevents floating or torsion of the cover 6 during its sliding movement. A finger-applying portion 6c is provided between the outer projection 6a and the inner projection 6b of the cover 6. The finger-applying portion projects slightly from the left upper end portion of the cover, as best seen in FIG. 8. Smooth sliding of the cover 6 can be accomplished by moving it vertically by applying finger pressure to portion 6c.

Reference numeral 8 designates a shield plate (see particularly FIG. 7) for covering the range finder 4. The shield plate surrounds a lens shutter mechanism, not shown, provided around lens 2 in a dead space which was not previously used. When the protective cover 6 is depressed by applying finger pressure to portion 6c, a projection 6d on the cover 6 engages a complementary projection 8a on the shield plate 8 to depress the same, so that the shield plate 8 is rotated counterclockwise about the lens 2 against the biasing force of a spring 9, whereby the shield plate moves from a position in which it covers the range finder 4 to a position in which it exposes the range finder. The shield plate 8 is guided in its rotation by slots 8b, 8c in the shield plate which receive pins 10, 11 secured to the camera housing 1. When the protective cover 6 is closed, the engagement between projections 8a and 6d is released and the shield plate 8 is rotated clockwise by the restitutional force of the spring 9, guided by pins 10, 11 to thereby shield the exposed surface of the range finder 4.

Figure 9:
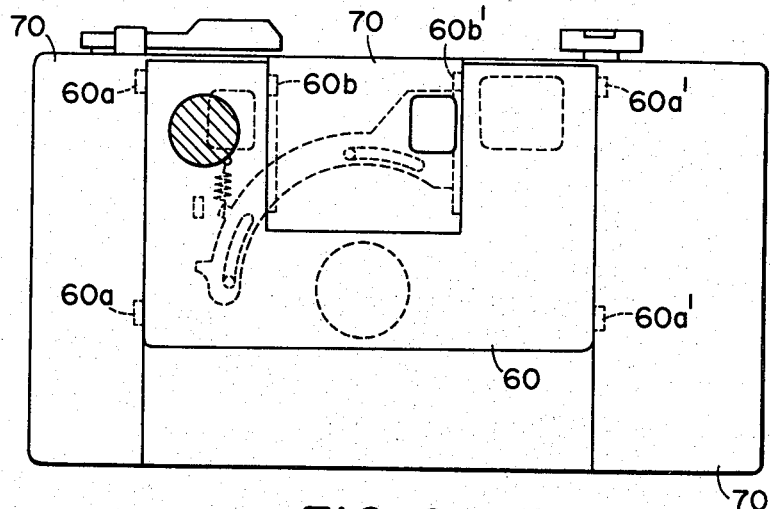
FIGS. 9, 10 and 11 illustrate a camera according to a second embodiment of the present invention, FIG. 9 being a front view showing a condition in which the camera optical system is covered by a protective cover, FIG. 10 being a front view showing a condition in which the optical system is uncovered, and FIG. 11 being a cross section of a guide portion for the protective cover.
Figure 10:
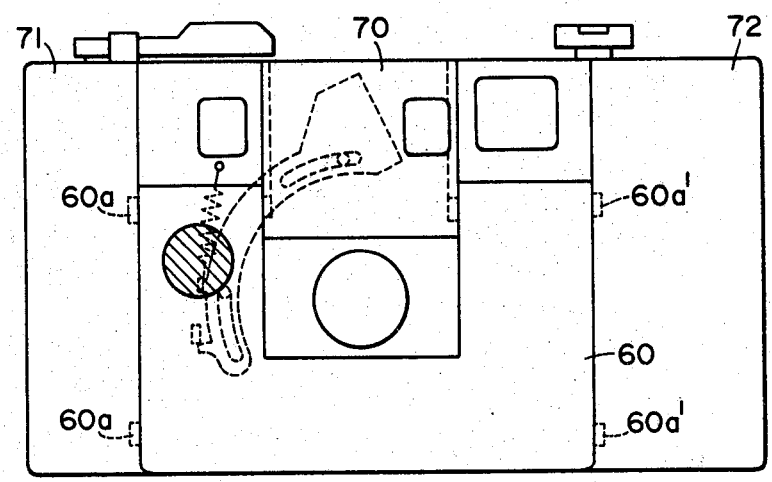
Figure 11:
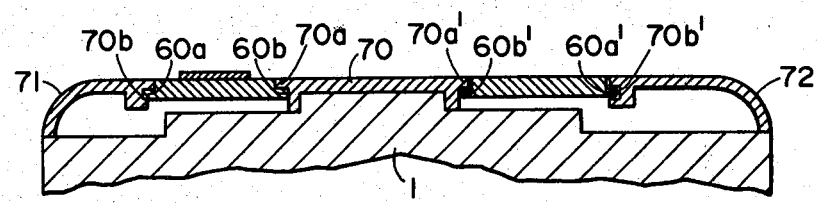

FIGS. 9, 10 and 11 show a second embodiment of the invention. In these figures, only the members of the second embodiment which differ from those of the first embodiment are given reference characters. This embodiment is similar to the first embodiment in that a pair of left and right projections 60b, 60b' provided on the inner edges of the left and right upper end portions of protective cover 60 are received behind edge portions 70a, 70a' of keep plate 70. However, in this case additional keep plates 71, 72 are provided on the left and right sides of the front face of the camera, which slidably support upper and lower pairs of projections 60a, 60a' on the outer edges of the protective cover 60 in vertically extending slide grooves 70b, 70b'. As best seen in FIG. 11, a data photographing mechanism or the like can be contained in the spaces provided between the left and right keep plates 71, 72 and the housing 1.

Figures 5, 6:
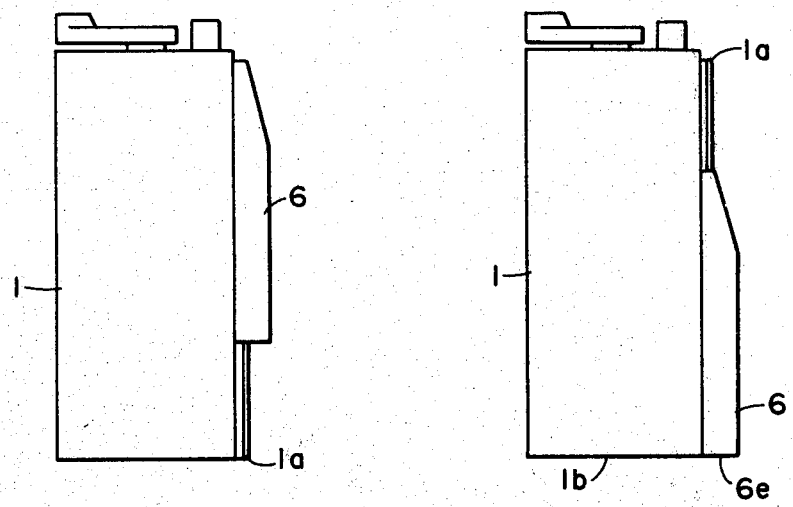
FIGS. 5 and 6 are side views of the camera shown in FIGS. 3 and 4, FIG. 5 showing the condition in which the optical system is covered and FIG. 6 showing the condition in which the optical system is uncovered.
Figure 7:
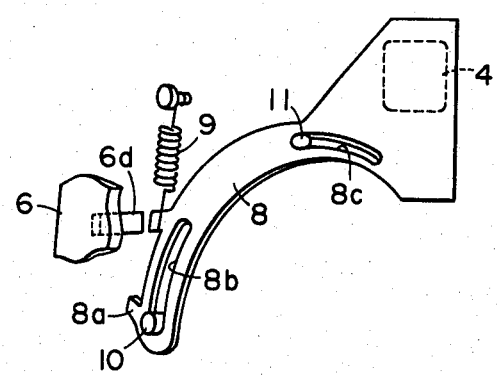
FIG. 7 is an enlarged perspective view of parts of the camera of FIG. 3.

As shown in the side view of FIG. 6, with the present arrangement, when the protective cover is depressed, the bottom surface 6e of the cover is substantially flush with the bottom surface 1b of the camera housing 1. Accordingly, the entire bottom surface of the camera becomes wider and the stability with which the camera rests on a flat surface may be increased.

Figure 12:
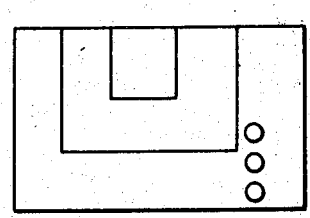
FIGS. 12 and 13 are diagrammatic front views of a camera according to a third embodiment of the present invention, FIG. 12 showing a condition in which the camera optical system is covered by a protective cover and FIG. 13 showing a condition in which the optical system is uncovered.
Figure 13:
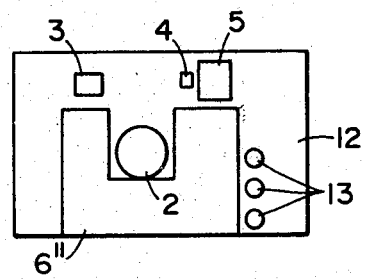

FIGS. 12 and 13 are front views showing a third embodiment of the present invention. FIG. 12 shows a condition in which the protective cover is closed, and FIG. 13 shows a condition in which the protective cover is opened. The difference of the U-shaped protective cover 6" from the U-shaped protective cover 6 of the first embodiment is that in order to cover the range finder 4 and the viewfinder 5 simultaneously, the cover portion for covering these elements is somewhat wider than the cover portion for covering range finder 3.

When protective cover 6" is depressed, the entire objective optical system in the front of the camera housing becomes exposed and this embodiment is simpler in construction than the previous embodiments.

In the above-described embodiments, the protective cover is slidable along the front face of the camera and, therefore, operating knobs 13 for data photographing, etc., can be provided on gripping portion 12 of the camera housing (see FIG. 13) giving a greater degree of freedom in designing the camera configuration.

In the present invention, the protective cover need not always be U-shaped, but may take, for example, an O-shape having its left and right upper portions closed; namely, a shape in which an aperture for exposing the lens is formed in the central portion of the cover.

According to the present invention, as has been described above, the protective cover is slidable vertically along the front face of the camera to facilitate gripping and holding of the camera and in addition, an operating member for data photographing and a flashlight-emitting portion can be disposed around the grip location and this leads to an increased degree of freedom in designing. Further, by touching and recognizing the boundary lines between the protective cover and the left and right gripping portions with a fingertip during photography, this may prevent the finger being moved from the gripping portions to cover the objective optical system.

While only preferred embodiments of the invention have been described herein in detail, the invention is not limited thereby and modifications can be made within the scope of the attached claims.

We claim:

1. In a camera having a camera housing, an objective optical system disposed on a front face of said camera housing, and a protective cover slidable along the front face of said housing between a position covering said optical system and a position exposing said optical system, the improvement wherein:

said front face of said camera housing has gripping portions on opposite sides of said objective optical system, respectively, the gripping portions being capable of being held by a user during photography;

said protective cover is located between said gripping portions and is slidable vertically between said positions;

the objective optical system includes a lens and left- and right-hand objective windows on opposite sides of the lens and wherein said cover has portions for covering and exposing said lens and said windows simultaneously by movement between said positions; and said lens is disposed substantially centrally of said front face, and said objective windows are disposed above said lens adjacent an upper edge of said camera housing, said portions of said protective cover comprising a base portion for covering said lens and a pair of upright portions for covering the respective objective windows, with a cutout between said pair of upright portions, said protective cover being brought from said covering position to said exposing position by downward sliding of the cover, whereby said lens becomes exposed in said cutout portion of the cover and said pair of objective windows become exposed above said upright portions.

2. A camera according to claim 1, including a third objective window, a shield member for covering and exposing said third objective window, and connection means between said cover and said shield member whereby movement of the cover between said positions effects equivalent movement of the shield member to cover and expose the third objective window, respectively.

3. In a camera having a camera housing, an objective optical system disposed on a front face of said camera housing, and a protective cover slidable along the front face of said housing between a position covering said optical system and a position exposing said optical system, the improvement wherein:

said front face of said camera housing has gripping portions on opposite sides of said objective optical system, respectively, the gripping portions being capable of being held by a user during photography;

said protective cover is located between said gripping portions and is slidable vertically between said positions;

the objective optical system includes a lens and left- and right-hand objective windows on opposite sides of the lens and wherein said cover has portions for covering and exposing said lens and said windows simultaneously by movement between said positions; and wherein the camera includes a third objective window, a shield member for covering and exposing said third objective window, and connection means between said cover and said shield member whereby movement of the cover between said positions effects equivalent movement of the shield member to cover and expose the third objective window, respectively.

4. A camera according to claim 3, wherein the shield member is guided for movement in an arc around the lens.

5. A camera according to claim 3 including biasing means urging the shield member to a position covering said third objective window and wherein said connection means includes interengageable means formed on said cover and said shield member, respectively, for moving said shield member from its covering position against the force of said biasing means responsive to movement of the cover from its covering position to its exposing position.

* * * * *